(12) United States Patent
Schneider et al.

(10) Patent No.: US 9,967,475 B2
(45) Date of Patent: May 8, 2018

(54) HEAD-MOUNTED DISPLAYING OF MAGNIFIED IMAGES LOCKED ON AN OBJECT OF INTEREST

(71) Applicant: ELBIT SYSTEMS LTD., Haifa (IL)

(72) Inventors: Ron Schneider, Haifa (IL); Abraham Zeitouny, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days. days.

(21) Appl. No.: 15/516,842

(22) PCT Filed: Oct. 7, 2015

(86) PCT No.: PCT/IL2015/050997
§ 371 (c)(1),
(2) Date: Apr. 4, 2017

(87) PCT Pub. No.: WO2016/056004
PCT Pub. Date: Apr. 14, 2016

(65) Prior Publication Data
US 2017/0318235 A1    Nov. 2, 2017

(30) Foreign Application Priority Data
Oct. 7, 2014 (IL) .......................................... 235073

(51) Int. Cl.
*H04N 5/262* (2006.01)
*H04N 5/232* (2006.01)
(Continued)

(52) U.S. Cl.
CPC ....... *H04N 5/2628* (2013.01); *G02B 27/0093* (2013.01); *G02B 27/0172* (2013.01);
(Continued)

(58) Field of Classification Search
CPC ..... H04N 5/2628; H04N 5/272; G06K 9/3233
See application file for complete search history.

(56) References Cited

U.S. PATENT DOCUMENTS

2002/0082498 A1* 6/2002 Wendt ................. G06F 19/3406
                                                            600/411
2010/0240988 A1* 9/2010 Varga ................... G02B 27/017
                                                            345/8

FOREIGN PATENT DOCUMENTS

WO    WO 2014037953 A2    3/2014

OTHER PUBLICATIONS

International Search Report; International Application No. PCT/IL2015/050997, 2 pages.

* cited by examiner

*Primary Examiner* — Zhubing Ren
(74) *Attorney, Agent, or Firm* — Burns & Levinson LLP; George N. Chaclas; Katherine M. Larson

(57) ABSTRACT

System and method for presenting magnified images locked onto object of interest in operator environment. A camera disposed on head of operator captures images of scene, where camera moves in conjunction with head movements. A head tracker detects the operator LOS by detecting at least head orientation. A processor obtains designated coordinates of object of interest in scene, and determines relative angle between detected operator LOS and object. The processor determines coordinates of object in acquired images, and applies image processing for fine stabilization of images based on previous images so as to compensate for operator head movements. The processor rescales an image region surrounding object of interest, in accordance with at least one display parameter, to produce respective magnified image frames of object. A head-mounted display displays the magnified images to operator such that object of interest appears in a defined position on display regardless of operator head movements.

20 Claims, 9 Drawing Sheets

(51) Int. Cl.
*G06K 9/32* (2006.01)
*G06K 9/00* (2006.01)
*H04N 5/272* (2006.01)
*G06T 11/60* (2006.01)
*H04N 13/04* (2006.01)
*G02B 27/01* (2006.01)
*G02B 27/00* (2006.01)

(52) U.S. Cl.
CPC ....... *G06K 9/00664* (2013.01); *G06K 9/3233* (2013.01); *G06T 11/60* (2013.01); *H04N 5/23267* (2013.01); *H04N 5/272* (2013.01); *H04N 13/044* (2013.01)

CAMERA IMAGES (HEAD DIRECTION #1):

(HEAD DIRECTION #2):

(HEAD DIRECTION #3):

HEAD-MOUNTED DISPLAYING OF MAGNIFIED IMAGES LOCKED ON AN OBJECT OF INTEREST

CROSS-REFERENCE TO RELATED APPLICATIONS

This application is a National Phase application filed under 35 U.S.C. § 371 of PCT International Application No. PCT/IL2015/050997 with an International Filing Date of Oct. 7, 2015, which claims priority to Israel Patent Application No. 235073, filed on Oct. 7, 2014, the entire contents of which are incorporated herein by reference.

FIELD OF THE INVENTION

The present invention generally relates to the fields of head-mounted displays, magnification optics, medical imaging, image processing, and display presentation.

BACKGROUND OF THE INVENTION

An optical loupe is a small magnification device with a set of lenses through which a user can view an enlarged appearance of a scene under examination, thereby allowing the user to clearly distinguish small details in the scene. Such magnification devices are widely used in a variety of applications and technical fields, ranging from photography, printing and jewelry, to medicine and dentistry. For example, when performing a medical procedure, such as a surgical operation (e.g., heart surgery, brain surgery, plastic surgery), the medical practitioner may use at least one loupe in order to magnify the treatment area. In particular, two separate loupes may be applied to each eye. The loupe(s) may be held by the user and positioned near his eye only when required, or alternatively may be permanently affixed in his field of view, such as being mounted onto spectacles or wearable head gear. However, such a configuration may distract the user and obstruct his peripheral vision. Handling the loupes can be cumbersome and provide surplus weight when worn by or affixed to the user. The loupes are also prone to falling off, breaking, and degradation over time. In addition, a standard loupe typically provides a magnification factor of about 4-5×, which may be insufficient when needing to examine extremely minuscule objects. Moreover, since each loupe is associated with a fixed magnification factor, it is not possible for a user to selectively adjust the desired magnification according to the particular usage, without replacing it with a different loupe entirely. Loupes also have a fixed focus distance, obligating the user to maintain his head at a predefined distance from the object. As the magnification of the loupe increases, the stability of the viewable magnified image is degraded.

The development of wearable imaging devices and wearable display devices has progressed substantially in recent years, leading to a wide variety of systems and products that incorporate such devices. For example, a head-mounted camera can be used to capture images for different applications, such as capturing real-time imagery of an environment in accordance with the changing positions and movements of the wearer. A head-mounted display (HMD) includes display optics disposed in front of one eye (monocular) or both eyes (binocular) of the user, affixed by means of wearable head or eye gear (e.g., helmet, eyeglasses, goggles, contact lenses). The display optics can be positioned directly in the eye line-of-sight (LOS) to provide a direct view, or deviated from the LOS to provide a glancing or peripheral view. A see-through HMD can direct artificial imagery to the wearer while allowing a transparent view of the surrounding environment. For example, supplementary visual content may be projected onto the HMD superimposed onto the background view for enhancing perception of the real-world environment, which is known as augmented reality. The supplementary content is typically presented in real-time and in the context of elements in the current environment.

A wearable camera or wearable display may be subject to vibrations and movements which can cause eye fatigue, nausea, and disorientation, precluding the user from being able to distinguish small details in the image and thus decreasing the effective resolution. These vibrations, caused by small and large head movements, can result in linear and rotational displacement of the image, which may significantly alter which content remains viewable within the image. Compensating for these vibrations in order to obtain a stabilized image may be achieved by mechanical techniques to stabilize the camera, and/or by image processing techniques to stabilize the acquired images. In some applications, users may want to view a video captured by the camera in real-time. In these cases, the wearable display can project the image directly from the wearable camera. When a user wants to observe and focus his sight on a particular object, he may direct the head-mounted camera to a certain LOS and try to maintain conformity with the current field of view associated with his head position and head direction. However, the head movements and camera vibrations diminish the user's ability to maintain focus on small details of the object. In particular, when the images projected onto the display are magnified, the effects of the head and camera movements are amplified in the resultant image vibrations. Alternatively, the user may want to maintain focus on the object of interest while keeping the object located in a convenient zone on the display, regardless of his current head position and direction.

U.S. Pat. No. 6,307,526 to Mann, entitled "Wearable camera system with viewfinder means", is directed to an apparatus that includes an electronic camera borne by headgear, and an electronic display borne by the headgear. The display is responsive to an electronic output from the camera, providing a viewfinder for the camera. A mirror is arranged to divert light that would otherwise enter an eye of a wearer to the camera, and to divert light emitted from the display to the eye of the wearer, such that diverted light from the display is collinear with light that would otherwise enter the eye. A beam splitter is positioned between the mirror and the eye. A polarizer in front of the camera is oriented to block polarized light emitted by the display.

U.S. Pat. No. 6,847,336 to Lemelson et al, entitled "Selectively controllable heads-up display system", is directed to a heads-up display system for use by a medical technician. The system includes a command computer processor for receiving inputs that represent data and for controlling the display of desired data. The computer communicates with and controls the heads-up display system, which is configured to display the desired data in a manner that is aligned in the user's field of view. The heads-up display includes a user interface incorporating "hands-free" menu selection to allow the user to control the display of various types of data. The hands-free menu selection may be carried out using an eye-tracking cursor and a speech recognition computer to point to and select specific menus and operations.

U.S. Pat. No. 8,138,991 to Rorberg et al, entitled "Real-time image scanning and processing", is directed to an apparatus for displaying an image with respect to a line-of-sight (LOS) with substantially no latency as perceived by a user. An image source provides a spatially unregistered image. A display processor spatially registers the image with the LOS. A displaying unit displays at least one spatially registered pixel on a displaying surface. An image processor selects at least one projection pixel to be displayed, and a pixel locator of the display processor determines, in each spatially unregistered image, the location of the spatially registered pixel corresponding to the selected projection pixel.

U.S. Pat. No. 8,611,015 to Wheeler et al, entitled "User interface", is directed to a head-mounted display (HMD) with an eye-tracking system, an HMD-tracking system, and a display configured to display virtual images to a wearer of the HMD. The virtual images may be dynamically adjusted based on the HMD-tracking data. The eye-tracking data is incorporated to compensate for drift in the displayed virtual images introduced from position and orientation sensor errors of the HMD-tracking system. In particular, the eye-tracking data may be used to determine a gaze axis and a target object in the displayed virtual images. The HMD may then move the target object towards a central axis. The HMD may record data based on the gaze axis, central axis, and target object to determine a user interface preference. The user interface preference may be used to adjust similar interactions in the HMD.

U.S. Pat. No. 8,669,919 to Ono, entitled "Head mounted display device", is directed to a head-mounted display device that provides a user with information while taking an image in a direction of his field of view. An image display mounted on the head of a user permits the views to visually recognize an image. An imager takes an image in a direction of a field of view of the user and generates a taken moving image. Unitary display image data to be displayed on the image display is acquired. A unitary moving image correlated with the unitary display image is generated from the moving image. When any other unitary moving images correlated with the same unitary display image corresponding to one of the unitary moving images are generated, it is determined whether to replace one of the unitary moving images with any other of the unitary moving images. When it is determined to replace a unitary moving image, it is replaced, while the unitary moving images that are not replaced are combined to generate a coherent continual moving image.

SUMMARY OF THE INVENTION

In accordance with one aspect of the present invention, there is thus provided a system for presenting magnified images locked onto an object of interest in the environment of an operator. The system includes at least one camera, a head tracker, a processor, and a head-mounted display (HMD). The camera is disposed on the head of the operator such that the camera moves in conjunction with the head of the operator. The processor is coupled with the camera, the head tracker, and the HMD. The HMD is worn by the operator. The camera is configured to acquire a sequence of image frames of a scene. The head tracker is configured to detect the line-of-sight (LOS) of the operator by detecting at least the orientation of the head of the operator. The processor is configured to obtain designated coordinates of at least one object of interest in the scene, to determine the relative angle between the detected operator LOS and the object of interest, and to determine the coordinates of the object of interest in the acquired image frames. The processor is further configured to apply image processing for fine stabilization of the image frames based on at least one previous image frame so as to at least compensate for head movements of the operator, and to rescale a region surrounding the object of interest in the image frames, in accordance with at least one display parameter, to produce respective magnified image frames of the object of interest. The HMD is configured to display the magnified image frames to the operator such that the object of interest appears in a defined position on the display regardless of the head movements of the operator. The processor may be further configured to apply image or signal processing for coarse stabilization of the image frames, based on the detected LOS of the operator. The processor may be further configured to crop the region surrounding the object of interest in the image frame prior to rescaling. The processor may be further coupled with a secondary imaging device, configured to acquire secondary image frames including the object of interest. The processor may be further configured to determine the coordinates of the object of interest in the secondary image frames, and the HMD may be further configured to selectively display the secondary image frames to the operator. The HMD may display the secondary image frames in conjunction with the magnified image frames from the camera. The system may further include a user interface, configured to receive instructions from the operator. The instructions may include: a designation of the object of interest in the imaged scene; an indication to switch views or change the imaging source of the displayed image; a designation of the display parameter; and/or an indication to increase or decrease the magnification factor of the displayed image. The user interface may be integrated with the head tracker, allowing the user to provide the instructions via head movements. The HMD may display the magnified image frame such that the object of interest appears superimposed at its true geolocation, in relation the LOS of the operator. The HMD may be configured to display supplementary content overlaid onto the magnified image frames displayed by the HMD. The supplementary content may appear magnified in relation to the magnification of the object of interest in the magnified image frame. The camera may be configured to acquire the sequence of image frames at an increased angular resolution relative to human vision angular resolution. The camera may include a plurality of cameras, where the HMD is configured to display a different image toward each eye of the operator, providing a stereoscopic view of the object of interest. The processor may be further configured to determine the distance between the operator and the object of interest, and to adjust the magnified image frame in accordance with the determined distance. The processor may be further configured to track multiple objects of interest in the acquired image frames, and to generate a plurality of magnified image frames respective of each object of interest, where the HMD is further configured to selectively display at least one of the generated magnified image frames. The system may further include an eye tracker coupled with the processor, the eye tracker configured to detect the gaze direction of the operator, where the LOS of the operator is further determined in accordance with the detected gaze direction. The camera may include: a CMOS or CCD camera; a visible light camera; an IR or NIR camera; a digital camera; a video camera; and/or a camera with an adjustable optical magnification setting. The HMD may include a transparent display, configured to present a displayed image while allowing a see-through view of the scene in the operator FOV. The transparent display may be configured to selectively reduce the transparency of at least a portion of the display area while presenting a displayed image. The camera and the HMD may be aligned along a common optical axis. The HMD may be further configured to provide a notification of an obstruction of the object of interest, or to provide a notification of the object of interest exceeding the FOV of the camera. The system may further include an illuminator, configured to illuminate the object of interest in accordance with the operator LOS.

In accordance with another aspect of the present invention, there is thus provided a method for presenting magnified images locked onto an object of interest in the environment of an operator. The method includes the procedure of acquiring a sequence of image frames of a scene, using at least one camera disposed on the head of the operator such that the camera moves in conjunction with the head of the operator. The method further includes the procedure of detecting the LOS of the operator by detecting at least the orientation of the head of the operator. The method further includes the procedures of designating coordinates of at least one object of interest in the scene; determining the relative angle between the detected operator LOS and the object of interest; and determining the coordinates of the object of interest in the acquired image frames. The method further includes the procedures of applying image processing for fine stabilization of the image frames based on at least one previous image frame so as to at least compensate for head movements of the operator; and rescaling a region surrounding the object of interest in the image frames, in accordance with at least one display parameter, to produce respective magnified image frames of the object of interest. The method further includes the procedure of displaying the magnified image frames on an HMD worn by the operator, such that the object of interest appears in a defined position on the display regardless of the head movements of the operator. The method may further include the procedure of applying image or signal processing for coarse stabilization of the image frames, based on the detected LOS of the operator. The method may further include the procedure of cropping the region surrounding the object of interest in the image frame prior to rescaling. The method may further include the procedures of acquiring secondary image frames that include the object of interest, using at least one secondary imaging device; and displaying the secondary image frames on the HMD. The display parameter may include: a magnification factor; a FOV of the displayed image frame; a relative location of the displayed image frame on the HMD; and/or selected ranges for contrast, sharpness and/or brightness of the displayed image frame. The procedure of acquiring a sequence of image frames may include acquiring a sequence of image frames at an increased angular resolution relative to human vision angular resolution. The procedure of displaying the magnified image frames on a HMD may include displaying a different image toward each eye of the operator, providing a stereoscopic view of the magnified object of interest. The procedure of detecting the LOS of the operator may further include detecting the gaze direction of the operator. The method may further include the procedures of providing a notification of an obstruction of the object of interest, or providing a notification of the object of interest exceeding the FOV of the camera. At least one of the method procedures may be performed iteratively.

BRIEF DESCRIPTION OF THE DRAWINGS

The present invention will be understood and appreciated more fully from the following detailed description taken in conjunction with the drawings in which.

DETAILED DESCRIPTION OF THE EMBODIMENTS

The present invention overcomes the disadvantages of the prior art by providing a system and method for displaying to a user a magnified image of a view seen through a head-mounted display (HMD), where the magnified image is based on an image captured by at least one head-mounted camera directed to a field of view conforming to the head direction or line-of-sight (LOS) of the user. The system may present a sequence of magnified image frames which remains locked on an object of interest viewable by the user, as determined in relation to the current user head direction or LOS. The image locking displays the object of interest in a pre-defined position on the display, regardless of the head movements of the user. The magnified image may also undergo image stabilization, such that a stabilized view of the object of interest is displayed to the user. The user may adaptively select relevant parameters and settings as required, such as designating a new object of interest, or adjusting the magnification level or other display parameters relating to the magnified images.

Figure 1:
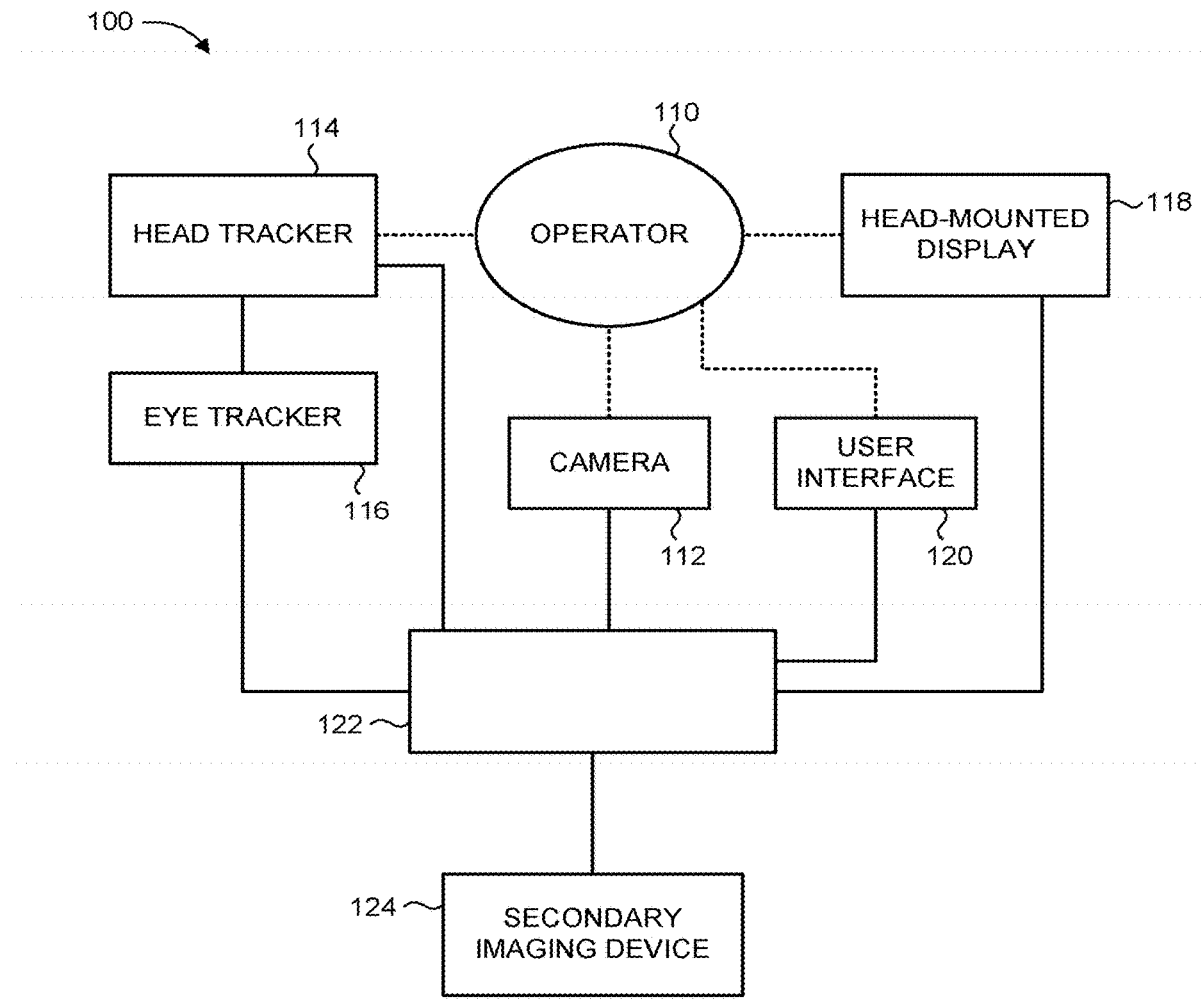
FIG. 1 is a schematic illustration of a system for presenting a magnified image of an object of interest in the environment of an operator, constructed and operative in accordance with an embodiment of the present invention.

Reference is now made to FIG. 1, which is a schematic illustration of a system, generally referenced 100, for presenting a magnified image of an object of interest in the environment of an operator, referenced 110, constructed and operative in accordance with an embodiment of the present invention. System 100 includes at least one head-mounted camera 112, a head tracker 114, an eye tracker 116, a head-mounted display (HMD) 118, a user interface 120, a processor 122, and a secondary imaging device 124. Processor 122 is communicatively coupled with camera 112, with head tracker 114, with eye tracker 116, with HMD 118, with user interface 120, and with secondary imaging device 124.

Camera 112 is mounted to or otherwise attached on or adjacent to the head of operator 110, such as being affixed to a wearable head gear (e.g., a helmet, a headband, goggles, and the like) worn by operator 110. System 100 generally includes a plurality of cameras, such as a pair of cameras 112 configured to produce a stereoscopic image (e.g., a left camera and a right camera). Each camera 112 may be situated directly above the head, or adjacent thereto (e.g., on top or side of the head, or above the shoulder), such that the LOS of camera 112 is aligned toward the general direction in which operator 110 is facing. In general, camera 112 is not necessarily directly aligned with the LOS of operator 110 (e.g., camera 112 may be aligned offset toward the left/right/ back relative to the operator LOS), so long as camera 112 moves in conjunction with the head of operator 110 and the LOS of operator 110 is measured. System 100 may include multiple cameras 112 with different fields of view (FOVs), allowing for imaging of a wider overall FOV than would be possible with a single camera 112.

Camera 112 may be any type of device capable of acquiring and storing an image representation of a real-world scene, including the acquisition of any form of electromagnetic radiation at any range of wavelengths (e.g., light in the visible or non-visible spectrum, ultraviolet, infrared, radar, microwave, RF, and the like). For example, camera 112 may be a complementary metal-oxide-semiconductor (CMOS) or charge-coupled device (CCD) camera operating in the visible to near infrared (NIR) spectrum. The main components of such cameras are the image sensor, lens, and electronic circuit. Camera 112 is operative to acquire at least one image frame, such as a sequence of consecutive image frames representing a video image, which may be converted into an electronic signal for subsequent processing and/or transmission. Accordingly, the term "image" as used herein refers to any form of output from an aforementioned image sensor, including any optical or digital representation of a scene acquired at any spectral region, and encompasses both a single image frame and a sequence of image frames (i.e., a "video image").

Camera 112 is configured to acquire images at an increased angular resolution relative to the human vision angular resolution, such as that of operator 110. Camera 112 may image at a plurality of varying resolutions, and may allow for selectively adjusting the resolution of the acquired image. For example, camera 112 may be a digital camera with adjustable settings. The angular resolution of camera 112 is related to the maximum optional digital magnification. The FOV of camera 112 is related to the possible range of head movements made by the operator 110, while maintaining the object of interest within the video frame.

Head-tracker 114 provides an indication of the general LOS of operator 110, based on the operator's head position. Such head-tracking devices are known in the art, as described for example in U.S. Pat. No. 4,208,725 to Lewis and in U.S. Pat. No. 4,439,755 to LaRussa. Eye-tracker 116 determines the eye gaze direction of operator 110, for example by determining the position of the center of the pupil with respect to the cornea or eyelids. Such eye-tracking devices are known in the art, such as described for example in U.S. Pat. No. 5,583,795 to Smyth, and in U.S. Pat. No. 5,331,149 to Spitzer et al. Eye tracker 116 is optional, and system 100 may alternatively include only a head tracker 114. The use of only head tracker 114 is generally sufficient for stabilization and locking onto the object of interest. The use of eye tracker 116 in addition to head tracker 114 may provide additional capabilities and flexibility depending on the eye position of operator 110.

HMD 118 includes a display embedded within a wearable apparatus, such as a helmet, a headband, a visor, spectacles, goggles, and the like, which is worn by operator 110. HMD 118 projects a video image onto the display to be viewed by the operator 110. The display optics can be positioned directly in the LOS of operator 110 to provide a direct view of the projected image, or may be deviated from the LOS of operator 110 to provide a glancing or peripheral view of the projected image. HMD 118 may be at least partially transparent, such that the user viewing HMD 118 can simultaneously observe images (or other visual content) superimposed onto the display along with a view of the physical environment through the display. A transparent HMD also provides operator 110 with situational awareness of his environment. Some HMDs may utilize an active or passive coating to decrease the level of transparency on the projected video area and thus increase the video contrast. This can be done when the video image is projected. It is noted that HMD 118 provides sufficient eye-relief (i.e., distance between the eye and the display) to allow for use by an operator 110 wearing eyeglasses. Alternatively, HMD 118 may incorporate vision correction optics, to preclude the need for eyeglasses or other vision correction eyewear.

User interface 120 allows operator 110, or another user of system 100, to control various parameters or settings associated with the components of system 100. For example, user interface 120 can allow operator 110 to adjust the resolution of the images acquired by camera 112, to adjust the magnification level of the displayed image, and the like. User interface 120 may include a cursor or touch-screen menu interface, and/or voice recognition capabilities for allowing operator 110 to enter instructions or data via speech.

Processor 122 receives instructions and data from the various system components. Processor 122 also performs any necessary image processing or analysis on the image frames acquired by camera 112 and generates a final image for displaying. Processor 122 may be situated at a remote location from the other components of system 100. For example, processor 122 may be part of a server, such as a remote computer or remote computing system or machine, which is accessible over a communications medium or network. Alternatively, processor 122 may be situated adjacent to operator 110 and/or integrated within other components of system 100. For example, processor 122 may be coupled to components of system 100 via a wireless connection.

Secondary imaging device 124 is another device capable of acquiring and storing an image representation of a real-world scene, in addition to camera 112. For example, secondary imaging device 124 may be a medical imaging device used in a medical treatment setting, such as: a digital microscope, an X-ray computed tomography (X-ray CT) scanner, an optical coherence tomography (OCT) scanner, a magnetic resonance imaging (MRI) scanner, an ultrasound imager, and the like. Secondary imaging device 124 may also be configured to image at selectively adjustable resolutions.

The components and devices of system 100 may be based in hardware, software, or combinations thereof. It is appreciated that the functionality associated with each of the devices or components of system 100 may be distributed among multiple devices or components, which may reside at a single location or at multiple locations. For example, the functionality associated with processor 122 may be distributed between multiple processing units (such as a dedicated image processor for the image processing functions). System 100 may optionally include and/or be associated with additional components not shown in FIG. 1, for enabling the implementation of the disclosed subject matter. For example, system 100 may include a power supply (not shown) for providing power to the various components, and may further include a memory or storage unit (not shown) for temporary storage of image frames or other types of data.

Figure 2:
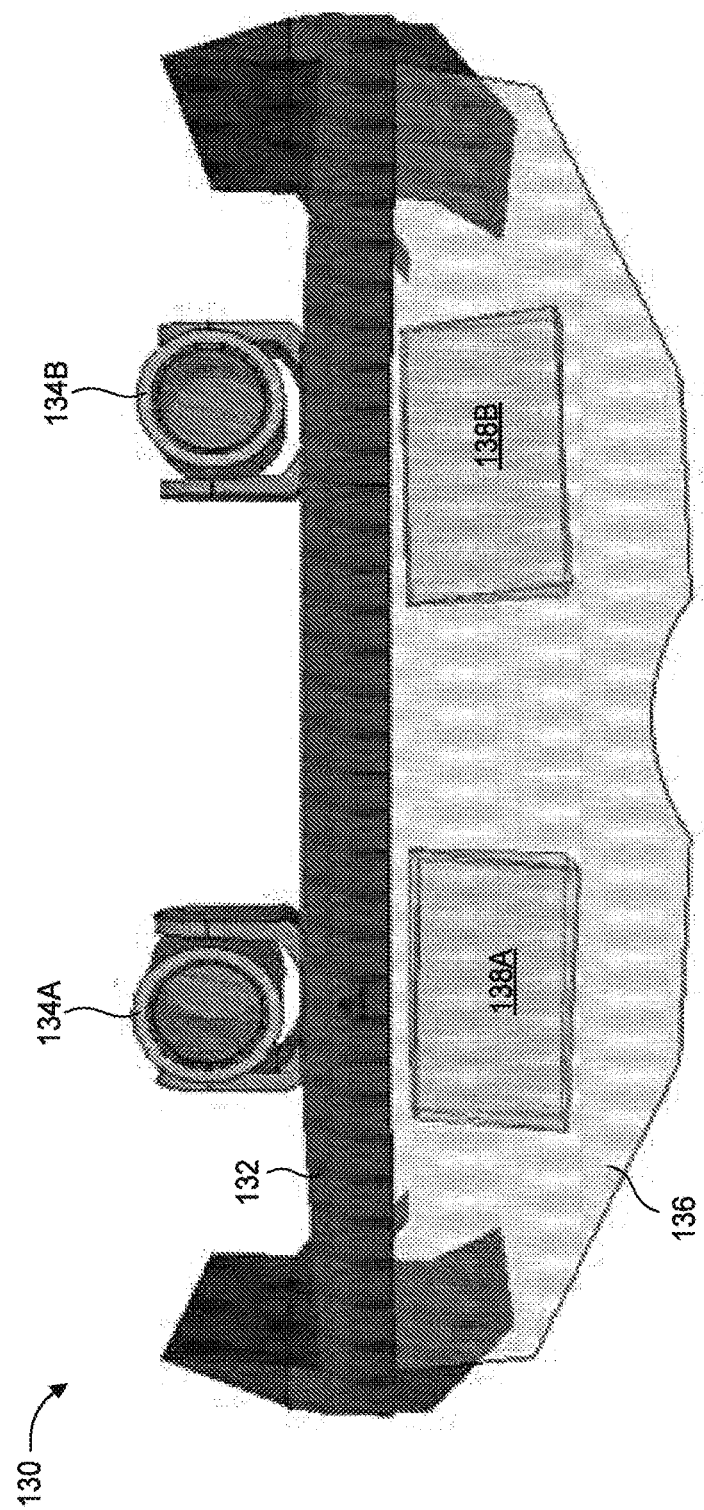
FIG. 2 is a schematic illustration of an exemplary configuration of the head-mounted camera and head-mounted display of the system of FIG. 1, operative in accordance with an embodiment of the present invention.

Reference is now made to FIG. 2, which is a schematic illustration of an exemplary configuration of the head-mounted camera and head-mounted display of the system of FIG. 1, operative in accordance with an embodiment of the present invention. FIG. 2 depicts a wearable apparatus, generally referenced 130, adapted to be fitted on and around the head of operator 110. Wearable apparatus 130 includes a base portion 132 on which are mounted two cameras 134A and 134B, such that the cameras 134A, 134B are situated above the head of operator 110 when apparatus 130 is worn (i.e., a right camera 134A and a left camera 134B). Wearable apparatus 130 further includes a display portion 136 embodied by a visor, which includes two display panels 138A, 138B disposed in front of the eyes of operator 110 when apparatus 130 is worn (i.e., one panel 138A disposed in front of the right eye of operator 110, and the other panel 138B disposed in front of the left eye of operator 110). It is appreciated that other types of wearable apparatuses and alternative configurations of wearable cameras or wearable displays are also within the scope of the present invention.

Figure 3:
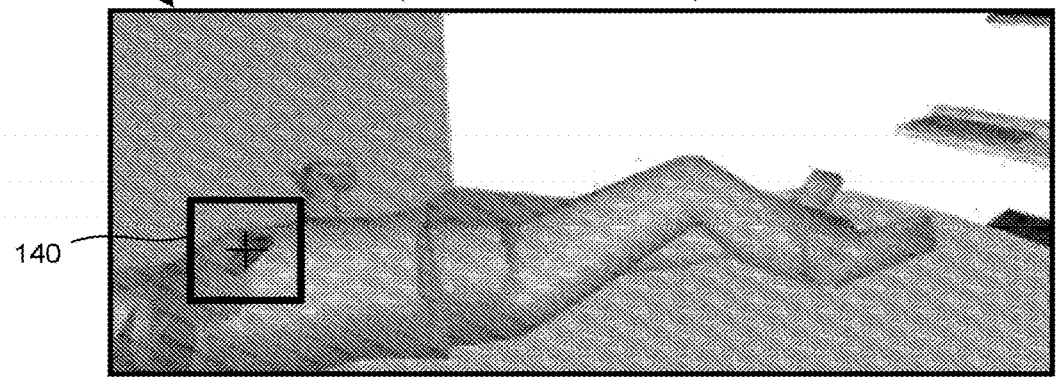
FIG. 3 is a schematic illustration of an exemplary sequence of images captured by the head-mounted camera of the system of FIG. 1 being worn by a medical practitioner performing a surgical procedure, operative in accordance with an embodiment of the present invention.
Figure 3:
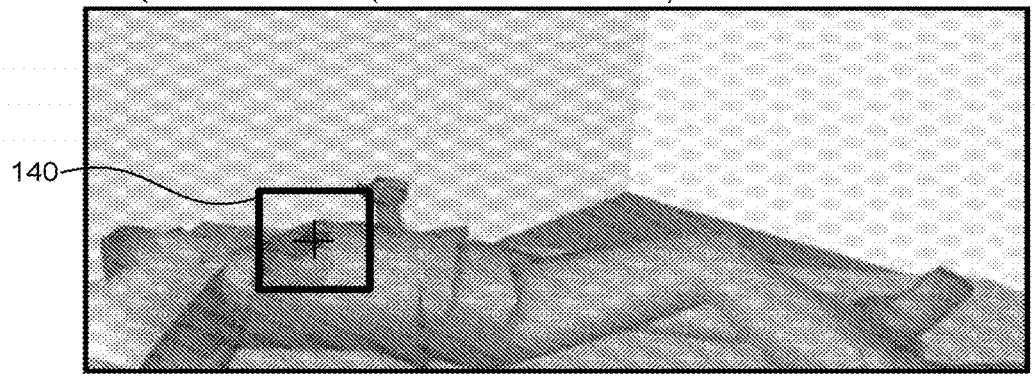
Figure 3:
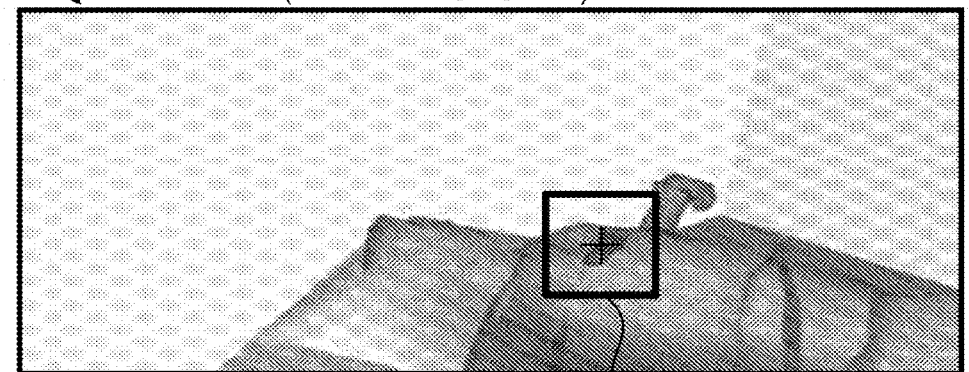
Figure 4:
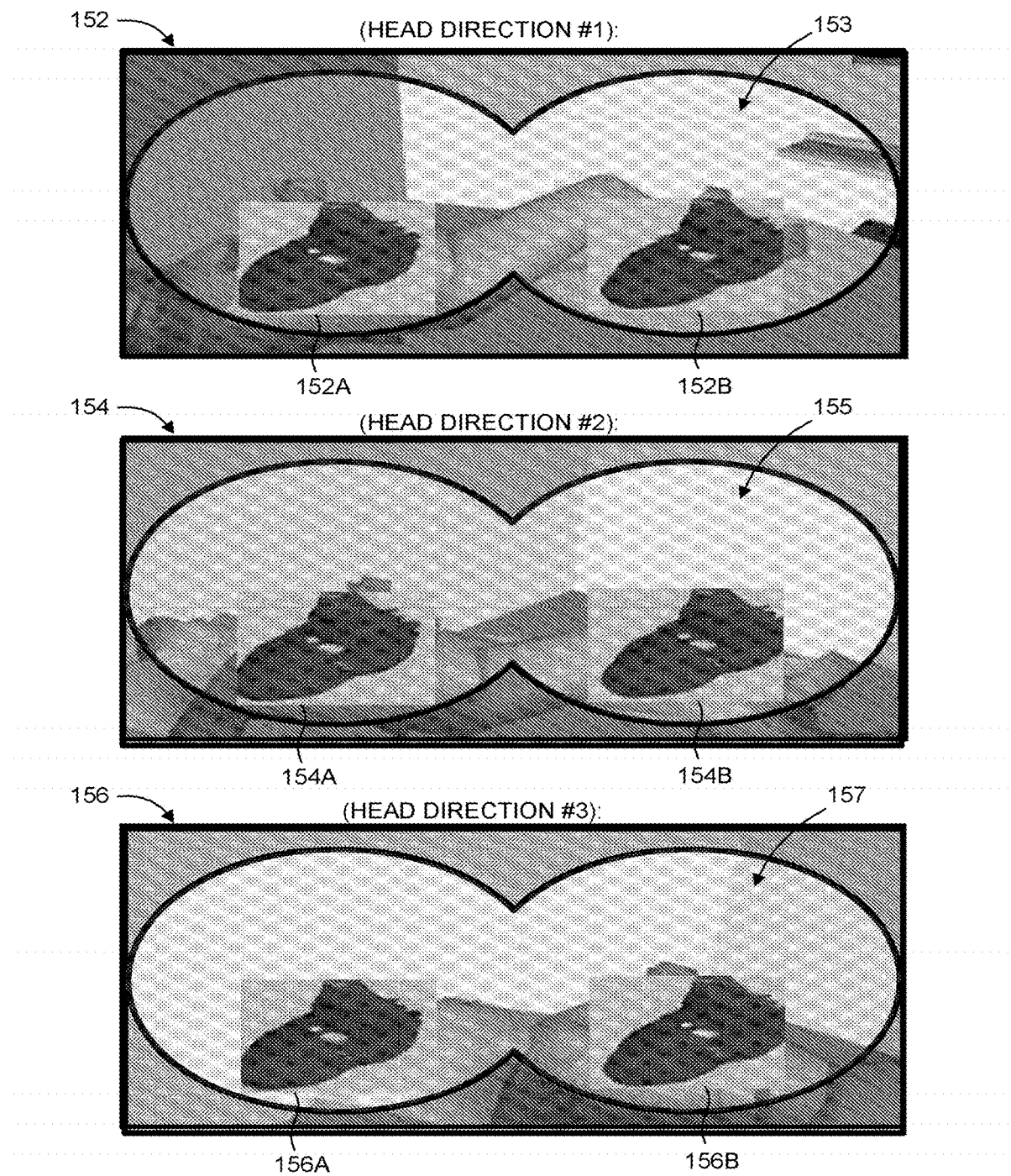
FIG. 4 is a schematic illustration of an exemplary sequence of images being displayed to the medical practitioner corresponding to the sequence of camera images of FIG. 3, operative in accordance with an embodiment of the present invention.

The operation of system 100 will now be discussed, for exemplary purposes, in the context of a medical practitioner performing a heart surgery procedure. The medical practitioner will be considered herein as an operator 110 of system 100. Reference is now made to FIGS. 3 and 4. FIG. 3 is a schematic illustration of an exemplary sequence of images captured by the head-mounted camera of the system (100) of FIG. 1 being worn by a medical practitioner performing a surgical procedure, operative in accordance with an embodiment of the present invention. FIG. 4 is a schematic illustration of an exemplary sequence of images being displayed to the medical practitioner corresponding to the sequence of camera images of FIG. 3, operative in accordance with an embodiment of the present invention. Operator 110 is wearing a head-mounted camera 112 and a head-mounted display 118 (while system 100 may generally include a plurality of cameras 112, such as left and right cameras 134A, 134B depicted in FIG. 2, the description hereinbelow is made with reference to a single camera 112 for exemplary purposes, although it is equally applicable to any number of cameras). In the course of the surgical procedure, camera 112 captures a sequence of images 142, 144, 146 at different points in time. The images 142, 144, 146 are captured at a certain resolution level, such as the maximum available resolution. Each captured image 142, 144, 146 is respective of a particular LOS of operator 110, and thus a particular imaged scene, depending on the head direction of operator 110 when camera 112 captured the image. In particular, camera image 142 is associated with a first head direction of operator 110; camera image 144 is associated with a second head direction of operator 110; and camera image 146 is associated with a third head direction of operator 110. It is noted that the head directions may remain the same over a particular sequence of images captured by camera 112, or may be different. For example, camera images 142 and 144 are acquired at substantially similar head directions, whereas the head direction associated with camera image 146 is substantially different from that of camera images 142 and 144. The camera images 142, 144, 146 may be converted to a digital signal representation of the captured scene, such as in terms of pixel values, which are forwarded to processor 122.

Operator 110 designates an object of interest in the treatment area for system 100 to lock onto. The object of interest may be any size, shape or pattern corresponding to one or more physical points in the real-world environment. For example, the object of interest may represent a unified physical object or entity located in the environment, or may represent a general environmental feature or collection of features (and not necessarily a unified object). The object of interest may be dynamic, i.e., such that the object and/or the operator 110 are in motion while the camera images 142, 144, 146 are captured. In this example, the object of interest is selected to be a section of the patient's heart. Operator 110 provides an indication of the object of interest 140 via user interface 120, such as by aligning a cross (or alternative design) on the respective object, or by entering the coordinates of the object 140 (e.g., the center coordinates) with respect to a reference coordinate system. For example, operator 110 may designate the patient's heart on a previous image of the treatment area displayed on HMD 118, such as via a speech command or manual designation through user interface 120. Processor 122 may define at least one reference point or fiducial marking in the field of view of operator 110, to enable registration of camera 112 for locking onto the designated object 140.

Processor 122 obtains the head direction of operator 110, associated with a given camera image 142, 144, 146 (i.e., the direction that operator 110 was facing at the time at which the respective camera image was captured), as detected by head tracker 114. Processor 122 proceeds to determine the relative angle between the operator head direction, and the (real-world) coordinates or orientation of the object of interest 140. System 100 may deduce the orientation of object 140 relative to the LOS of operator 110 based on the head direction data from head tracker 114, the coordinates of object 140, applied filters for prediction and stabilization, and/or directly from the acquired camera images 142, 144, 146 (e.g., without using a dedicated head tracker 114). Multiple techniques can be used to provide the position and/or orientation of the operator's head relative to the object of interest 140. One such technique is using head tracker 114 and calculating the distance from operator 110 to the object 140 by calculating the parallax between a pair of images captured by respective stereoscopic cameras (138A, 138B). Another technique is by using the camera focus to estimate the distance. A further technique may be by placing a reference object near the object of interest 140, such as a transmitter that provides accurate distance information.

Processor 122 then determines the (image) coordinates of the object of interest 140 as it appears on the camera images. In particular, processor 122 tracks the location of object of interest 140 over the sequence of image frames 142, 144, 146 captured by camera 112. For each camera image 142, 144, 146, object 140 is indicated by a boundary centered by a cross. Object 140 may be represented by a collection of pixels on the image that represent a unified physical object located in the environment. It is noted that processor 122 may obtain multiple sets of image frames acquired by multiple cameras 112 (e.g., each covering a different FOV), and determine selected image frames to use for identifying the object coordinates, such as based on the operator LOS as detected by head tracker 114 and/or based on image processing.

Operator 110 further indicates via user interface 120 the relevant parameters for the image to be displayed, such as: the magnification factor; the FOV of the displayed image; the relative location of the image on HMD 118; selected ranges for contrast, sharpness and/or brightness in the displayed image; different image processing operations (e.g., histogram equalization, tracking, etc); and the like. System 100 may control certain components in accordance with the selected parameters, such as controlling different imaging characteristics of camera 112 (e.g., angular/optical resolution, field of view, focal distance, dynamic range, sensitivity, and the like) when capturing subsequent image frames, in order to enable the selected magnification level of the displayed image. System 100 may operate under default settings, which may be initialized during a preliminary calibration process, such that system 100 selects default parameters (e.g., default magnification factors and display FOV) unless instructed otherwise. Operator 110 may change any of the display parameters over time, or may define conditions for altering or adjusting the display parameters automatically. For example, system 100 may be instructed to display images at a first magnification for an initial period of time, and then display at a second magnification during a following period of time; or alternatively, to display a first series of image at one magnification and a next series of images at a different magnification.

Subsequently, processor 122 manipulates the camera images 142, 144, 146 using standard image processing techniques, in order to generate a final image of object 140 in accordance with the selected display parameters. In particular, processor 122 crops a region of interest in the image frame 142, 144, 146, by removing at least some portions of the image surrounding the object of interest 140, and then digitally magnifies the remaining (cropped) image portion by the required amount. The final image frames are then displayed to operator 110 on HMD 118, providing a magnified view of object 140 over a period of time, regardless of the position and head direction of operator 110. It is noted that a magnified image may also be generated without cropping, such as by rescaling the entire image frame captured in a particular camera FOV, so as to achieve the desired magnification factor on the particular display FOV. For example, if camera 112 captures images 142, 144, 146 at a FOV of 10 degrees, and display 118 is characterized by a FOV of 50 degrees, then processor 122 can resize the entire image 142, 144, 146 (rather than just the cropped region of interest) to fit display 118 at 20 degrees to obtain a magnification factor of two (×2), or resize the entire image to fit display 118 at 50 degrees to obtain a magnification factor of five (×5). It is further noted that processor 122 may receive from camera 112 only selected portions of the captured image frames 142, 144, 146, such as just the image pixels in a window surrounding the object of interest 140 (i.e., representing a "region of interest"), rather than receiving the entire image frames, thereby essentially implementing the "cropping" process in camera 112 itself. Minimizing the transmission of image pixel data in such a manner may serve to reduce the latency of system 100, increase the frame rate, and decrease computation time and power consumption.

Referring to FIG. 4, displayed view 152 corresponds to camera image 142, associated with a first head direction of operator 110. In particular, a pair of magnified images 152A, 152B of the heart is projected in front of each eye of operator 110, such as on respective display panels (e.g., display panels 138A, 138B seen in FIG. 2), while a transparent portion of HMD 118 shows the background area 153 viewable by operator 110 in accordance with where operator 110 is currently facing (i.e., the first head direction). Similarly, displayed view 154 corresponds to camera image 144, associated with a second head direction of operator 110. In image 154, operator 110 sees another pair of magnified images 154A, 154B of the patient's heart (representing the state of the heart at the time that camera image 144 was captured). Finally, displayed view 156 corresponds to camera image 146, associated with a third head direction of operator 110. In image 156, operator 110 sees a further pair of magnified images 156A, 156B of the patient's heart (representing the state of the heart at the time that camera image 146 was captured). It is noted that the magnified images may obstruct at least a portion of the background scene viewable through HMD 118, since the magnification of the images increases their relative size relative to the background features in the real-world environment. For example, if magnified images 152A, 152B have a magnification factor of two (2), then images 152A, 152B will occupy twice as much space in display view 152 when projected onto HMD 118 (i.e., compared to the viewable space occupied by the non-magnified patient's heart), thereby obstructing a portion of the background area 153 in the vicinity of where the magnified images 152A, 152B are projected. Moreover, in order to improve the contrast of a displayed video image, the transparency of HMD 118 may be substantially reduced (or removed completely), so as to prevent light from the background area (153) from creating a strong DC signal that would interfere with the projected magnified images (152A, 152B).

Each magnified image 152A, 152B may correspond to a respective camera, such as a right-eye image corresponding to a right-side camera and a left-eye image corresponding to a left-side camera, thereby producing a stereoscopic vision effect. Alternatively, HMD 118 may display a single magnified image, disposed in front of both eyes, or in front of only a single eye, of operator 110. Further alternatively, HMD 118 may display two (or more) magnified images that are identical, such as the same image to each eye of operator 110. Operator 110 may select from the aforementioned options for HMD 118 to display (e.g., as part of the display parameters indicated by operator 110 via user interface 120). It is noted that system 100 may operate substantially in real-time, such that there is substantially low latency between capturing the original image frames by camera 112 and displaying the final (magnified) image frames by HMD 118 (e.g., a latency that is nominally less than the duration of capturing an individual image frame).

Processor 122 may optionally perform image stabilization on the camera images 142, 144, 146 when generating the magnified image for display, based on (at least a portion of) a previous (e.g., cropped and magnified) image frame. This image stabilization serves to compensate for movements or vibrations in the displayed image resulting from head movements of operator 110 and from noises or inaccuracies of head tracker 114. The image stabilization can be based on standard image processing stabilization techniques, using any relevant information of any previous image frame (or frames). For example, processor 122 may perform autocorrelation between different image frames acquired by stereoscopic cameras (138A, 138B) to determine the distance between operator 110 and object 140, in order to compensate for the parallax between the operator eyes and the cameras 138A, 138B. Alternatively, cameras 138A, 138B and HMD 118 may be positioned such that they are aligned along a common optical axis, for example using a beam splitter, in order to substantially prevent parallax. The image stabilization may be implemented using fiducial markings, such as stickers or tags with a unique symbol or mark (e.g., a reticle), placed onto or adjacent to the object of interest 140, to serve as reference points when processing the images.

According to another embodiment of the present invention, multiple objects of interest may be designated. Accordingly, system 100 may generate multiple sets of magnified images respective of each one of the designated objects (following the method described hereinabove for a single object), and then selectively display the magnified image sets of the different objects on HMD 118. For example, operator 110 may provide instructions to selectively toggle between viewing a first sequence of magnified image frames locked onto a first object 140A and a second sequence of magnified image frames locked onto a second object 140B (e.g., by means of voice commands, manual designations, head gestures, and the like). Alternatively, HMD 118 may display both sets of images to operator 110 simultaneously (i.e., both the first object image frames and the second object image frames). Further alternatively, processor 122 may automatically determine which of the designated objects to magnify and lock onto, in accordance with the head direction (LOS) of operator 110 or other criteria (for example, by locking onto the object 140A that is more closely aligned with the current LOS of operator 110).

A scenario may arise in which an obstruction occurs after system 100 has locked onto the designated object 140, such as a hand or other body part obstructing the view of object 140 on the camera images 142, 144, 146. In this case, system 100 may determine by image processing that such an obstruction has occurred, and act accordingly. For example, system 100 may utilize various warning measures, such as visual indications (e.g., markers, symbols) and/or audio indications (e.g., alarms, beeps), to notify the operator 110 about the obstruction. For example, the presence of an obstruction may be indicated to operator 110 by darkening a portion of the display on HMD 118, which can also serve to reduce eye fatigue. Another option is to cease image stabilization processes (fine stabilization, cropping, digital magnification), while maintaining only filtering/stabilization based on the LOS data from head tracker 114, until the obstruction has been removed.

Another scenario is when the operator 100 moves his head in such a manner that the designated object 140 is no longer in the FOV of the camera 112, such as by turning his head excessively. System 100 may utilize head tracker 114 to detect when the object of interest 140 has exceeded the camera FOV, or when the object of interest 140 is about to exceed the camera FOV, and notify operator 110 accordingly, such as by providing a visual indication on HMD 118 (e.g., arrows or symbols) and/or an audio indication (alarms, beeps). System 100 may also direct operator 110 to reposition his head as required in order to move object 140 back into the camera FOV (e.g., via visual and/or audio instructions). System 100 may alternatively ceases the stabilization, magnification and object locking processes, and may display the original camera images 142, 144, 146, or a previous magnified image frame of object 140, on HMD 118 until object 140 re-enters the FOV of camera 112 or until the obstruction is removed.

Figure 5:
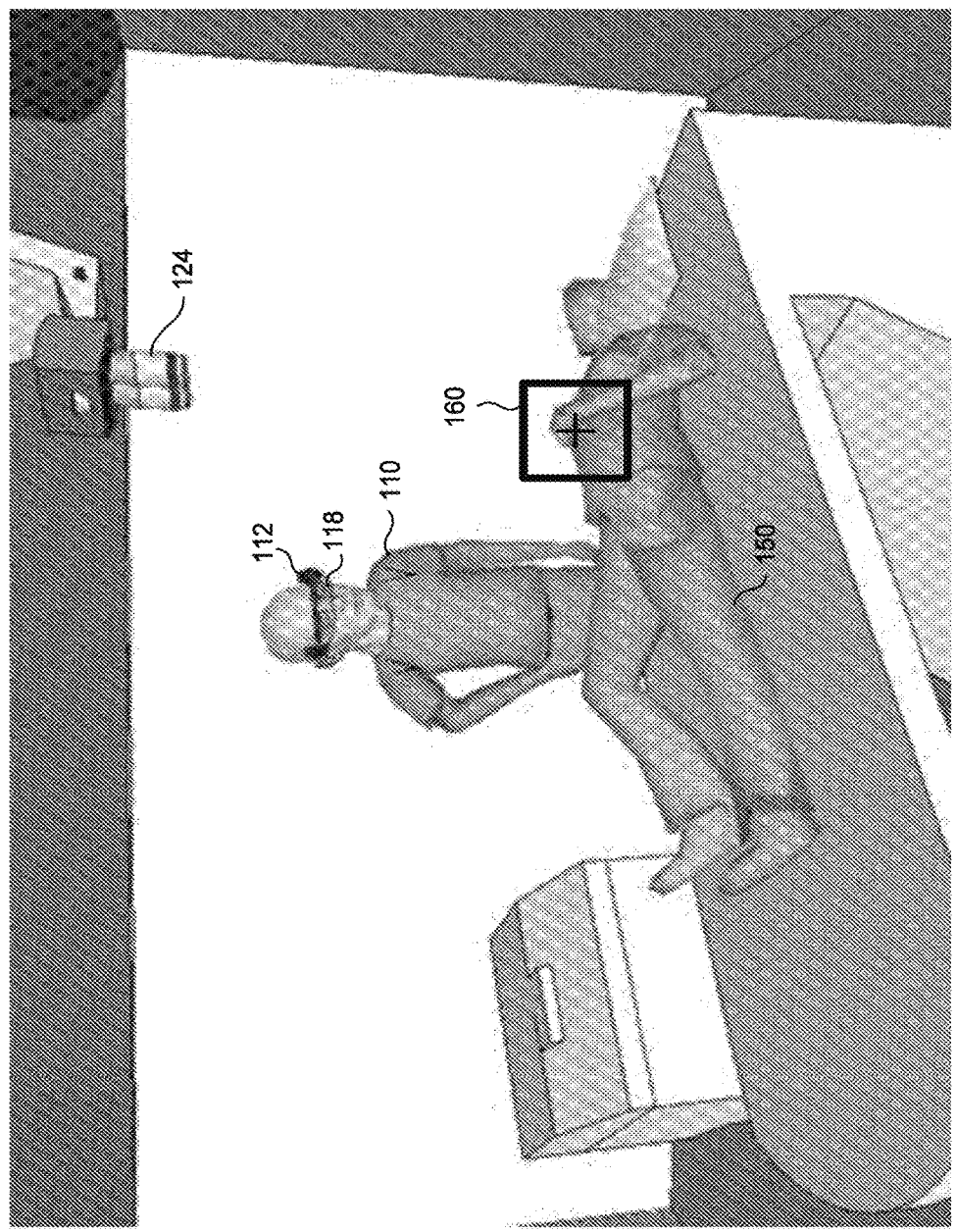
FIG. 5 is a schematic illustration of the system of FIG. 1 being used to display images of an object of interest, obtained from different imaging sources, to a medical practitioner performing a surgical procedure, constructed and operative in accordance with another embodiment of the present invention.

System 100 may optionally display to operator 110 images acquired by secondary imaging device 124, alternately with or simultaneously with the magnified images associated with camera 112. Operator 110 may selectively toggle between viewing the camera-based images, the secondary imaging device-based images, or both simultaneously. Reference is now made to FIG. 5, which is a schematic illustration of the system of FIG. 1 being used to display images of an object of interest, referenced 160, obtained from different imaging sources, to a medical practitioner performing a surgical procedure, constructed and operative in accordance with another embodiment of the present invention. Operator 110 is wearing a head-mounted camera 112 and a head-mounted display 118. While camera 112 acquires a sequence of image frames relating to the patient 150 undergoing the surgical procedure, secondary imaging device 124, embodied by a digital microscope, also acquires a sequence of image frames of the treated patient 150. In particular, the original images acquired by camera 112 and digital microscope 124 include at least an object of interest 160 selected by operator 110, which in this example is the patient's heart. Each image acquired by camera 112 and by digital microscope 124 is associated with the respective head direction of operator 110 at the time these images were captured. Alternatively, only the camera images are associated with the respective head directions of operator 110, while the digital microscope 124 is aligned such that the FOV encompasses object 160 (but is not necessarily centered on object 160). Processor 122 receives an indication of the real-world coordinates of object 160, and determines the relative angle between the head direction of operator 110 and the coordinates of object 160. Processor 122 then determines the image coordinates of object 160 in each camera image and digital microscope image. In this manner, the location of object of interest 160 is tracked over the sequence of image frames captured by camera 112 and captured by digital microscope 124. Processor 112 then proceeds to manipulate the images obtained by each imaging source in order to generate images of object of interest 160 for display, in accordance with selected display parameters for each imaging source. It is noted that operator 110 may select different display parameters respective of the images associated with each image source. For example, operator 110 may select a first magnification factor and/or display location for displaying the images obtained by camera 112, and a different magnification factor and/or display location for displaying the images obtained by digital microscope 124. Processor 122 performs the relevant image processing operations, such as cropping, digital magnification and/or stabilization, as necessary, to generate final images for displaying associated with each imaging source. It is noted the original images obtained from digital microscope 124 may undergo minimal (or no) processing for preparing the corresponding image for display, but may be presented substantially as is. For example, digital microscope 124 may be directed to capture the original image in accordance with the relevant display parameters (e.g., magnification, FOV, display location), such that the original image can be directly displayed on HMD 118.

Figure 6A:
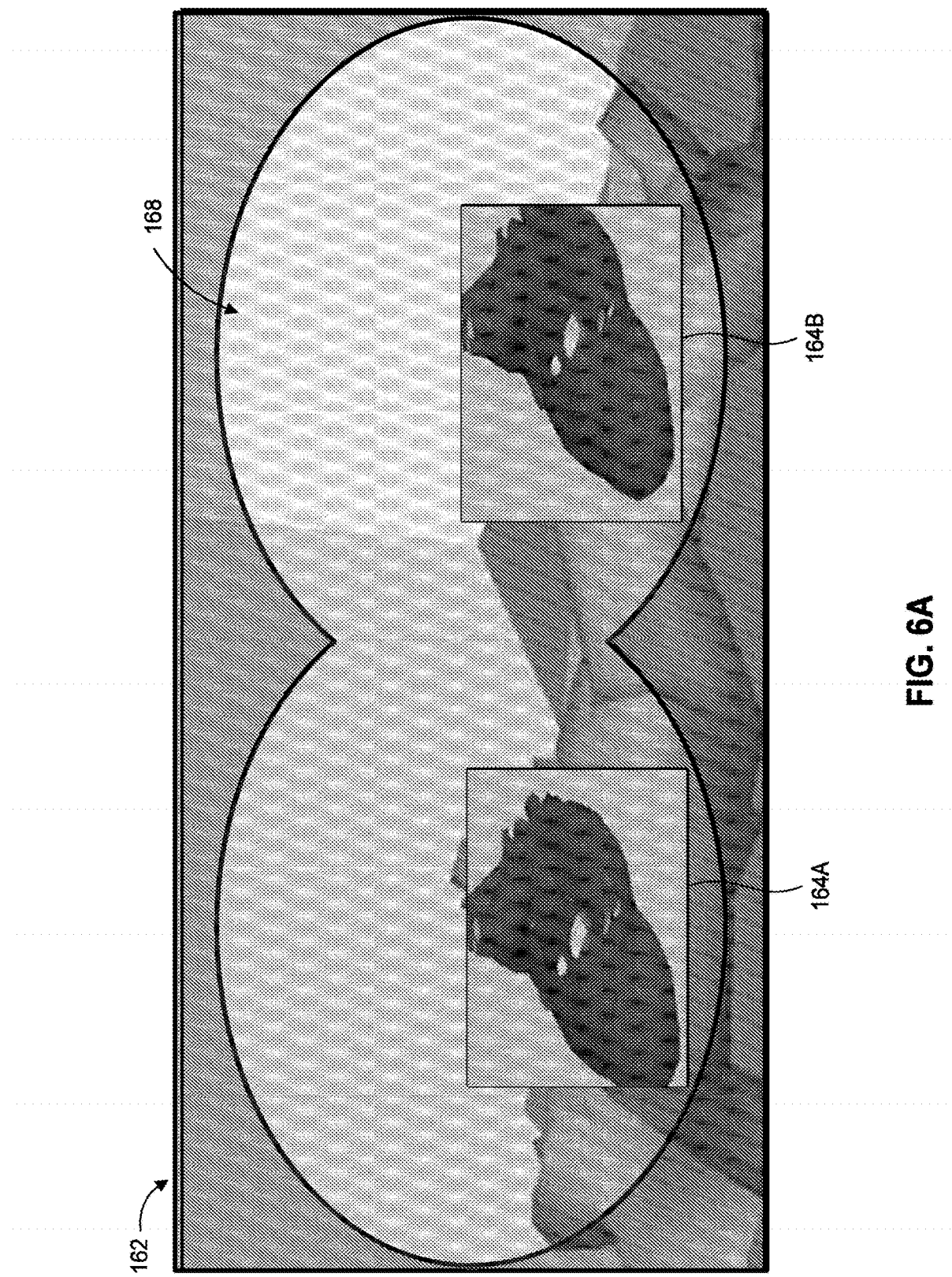
FIG. 6A is a schematic illustration of an exemplary view seen through the head-mounted display of the operator of FIG. 5, displaying only magnified imagery associated with the head mounted camera, operative in accordance with an embodiment of the present invention.
Figure 6B:
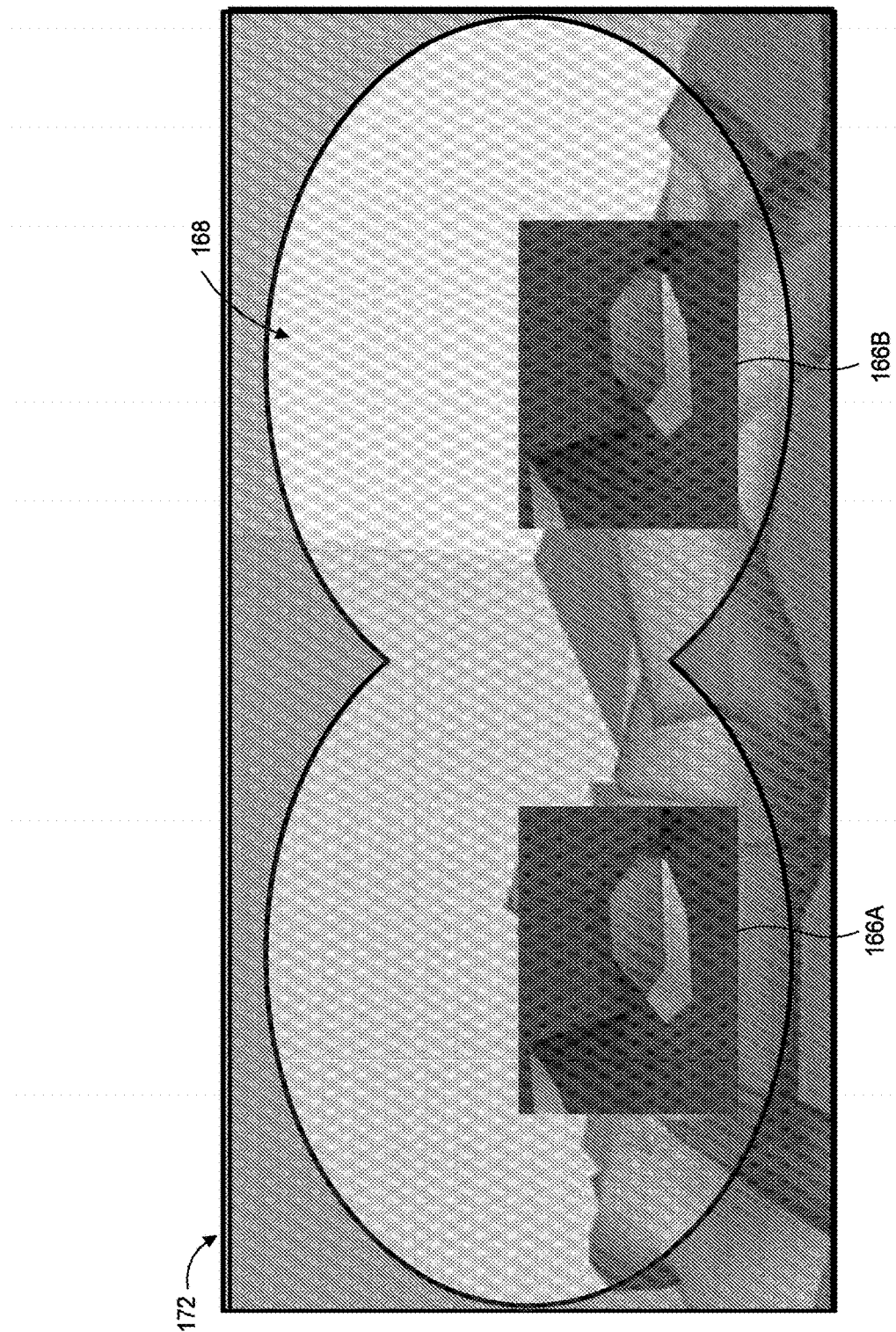
FIG. 6B is a schematic illustration of an exemplary view seen through the head-mounted display of the operator of FIG. 5, displaying only magnified imagery associated with the secondary imaging device, operative in accordance with another embodiment of the present invention.
Figure 6C:
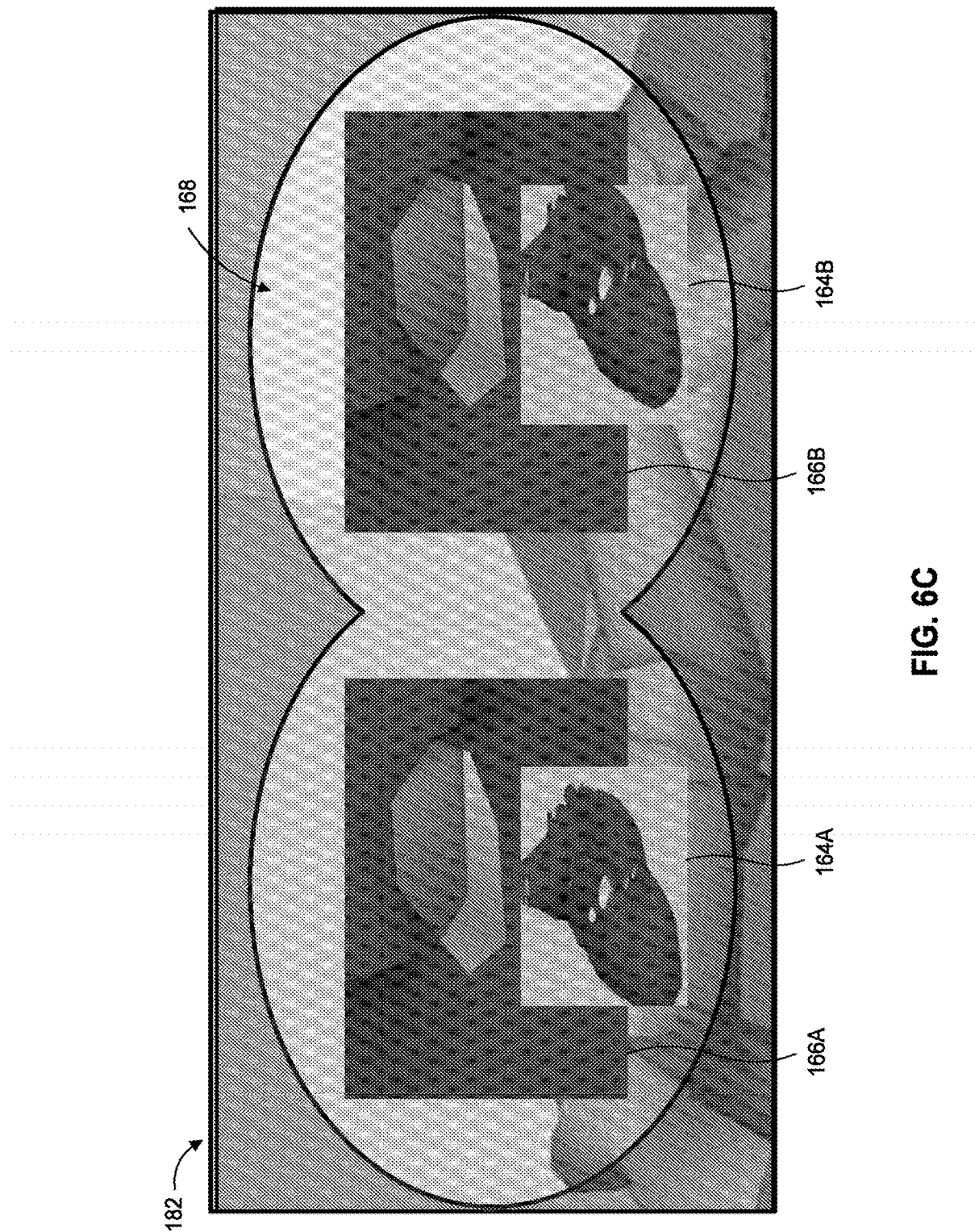
FIG. 6C is a schematic illustration of an exemplary view seen through the head-mounted display of a user of the system of FIG. 5, displaying magnified imagery associated with both the head mounted camera and the secondary imaging device, operative in accordance with a further embodiment of the present invention.

Reference is now made to FIGS. 6A, 6B and 6C. FIG. 6A is a schematic illustration of an exemplary view, generally referenced 162, seen through the head-mounted display of the operator of FIG. 5, displaying only magnified imagery associated with the head mounted camera, operative in accordance with an embodiment of the present invention. FIG. 6B is a schematic illustration of an exemplary view, generally referenced 172, seen through the head-mounted display of the operator of FIG. 5, displaying only magnified imagery associated with the secondary imaging device, operative in accordance with another embodiment of the present invention. FIG. 6C is a schematic illustration of an exemplary view, generally referenced 182, seen through the head-mounted display of a user of the system of FIG. 5, displaying magnified imagery associated with both the head mounted camera and the secondary imaging device, operative in accordance with a further embodiment of the present invention. Each of the displayed views 162, 172, 182 corresponds to the same point in time at which a respective image is acquired by camera 112 and by digital microscope 124, while operator 110 is facing a particular direction. In display view 162 (FIG. 6A), operator 110 sees a pair of magnified images 164A, 164B of the patient's heart (i.e., region of interest 160) and a background area 168. Magnified images 164A, 164B are based on the images captured by the head-mounted camera(s) 112 (i.e., following the relevant processing of the initial camera images, including magnification and/or stabilization). In display view 172 (FIG. 6B), operator 110 sees a pair of magnified images 166A, 166B of the patient's heart and a background area 168. Magnified images 166A, 166B are based on the images captured by digital microscope 124 (i.e., following any necessary processing of the initial microscope images, including magnification and/or stabilization). In display view 182 (FIG. 6C), operator 110 sees the pair of magnified images 164A, 164B of the patient's heart based on the images captured by head-mounted camera(s) 112, concurrently with the pair of magnified images 166A, 166B of the patient's heart based on the images captured by digital microscope 124. The camera-based images (164A, 164B) may be presented together with the microscope-based images (166A, 166B) in any suitable manner, such as overlapping one another, side-by-side, above and below, and the like, to provide operator 110 with an adequate view of both imaging sources (e.g., without obstructing the background view 168 of the physical environment). Operator 110 may provide instructions to selectively toggle between viewing the camera-based images and/or the secondary imaging device-based images, such as via voice commands, manual designations (e.g., pressing a button), head gestures, and the like. It is appreciated that system 100 may provide for a smooth transition between the view of the camera-based images (164A, 164B) and the view of the microscope-based images (166A, 166B). For example, system 100 may switch between the camera-based images (164A, 164B) and the microscope-based images (166A, 166B) at a substantially high frame rate (e.g., higher than 25 frames per second). As discussed previously, the magnified images (164A, 164B and/or 166A, 166B) may obstruct at least a portion of the background scene (168) viewable through HMD 118, since the magnification of the images increases their relative size in the display view relative to the background features in the real-world environment.

System 100 may also display supplementary content on HMD 118 related to the designated object of interest (e.g., augmented reality). For example, referring to FIGS. 3 and 4, processor 122 may identify object 140 as representing the patient's heart, obtain or determine relevant information relating to the patient's heart (e.g., heart rate or electrical activity waveform obtained from an electrocardiograph), and then project the appropriate visual content overlaid onto or adjacent to the magnified images of the heart (152A, 152B) on HMD 118. The visual (augmented reality) content may optionally be magnified, such as in conformity with the magnification factor of the magnified images (152A, 152B) displayed on HMD 118. The supplementary content may be any type of graphical or visual design, such as: text; images; illustrations; symbology; geometric designs; highlighting; changing or adding the color, shape, or size of at least a portion of the region of interest; and the like. Furthermore, supplementary content may include audio information, which may be presented in addition to the magnified images of the object of interest on HMD 118, such as the presentation of video imagery or relevant speech announcing or elaborating upon relevant features in the displayed images of the object.

System 100 may further include a light source or illuminator, configured to illuminate the designated object of interest 140 in accordance with the head direction or LOS of operator 110. For example, operator 110 may be fitted with a wearable or head-mounted illumination source, such that the alignment of the illuminator is linked to the head direction or LOS of operator 110.

According to a further embodiment of the present invention, multiple systems of the present invention (such as system 100) may be communicatively coupled with one another, allowing for additional functionality and features. For example, data may be transmitted/received between different HMDs. In another example, image fusion may be implemented between images captured from head-mounted cameras of different operators. In a further example, the magnified image of the object of interest based on a first operator camera may be displayed on the HMD of a second operator.

Figure 7:
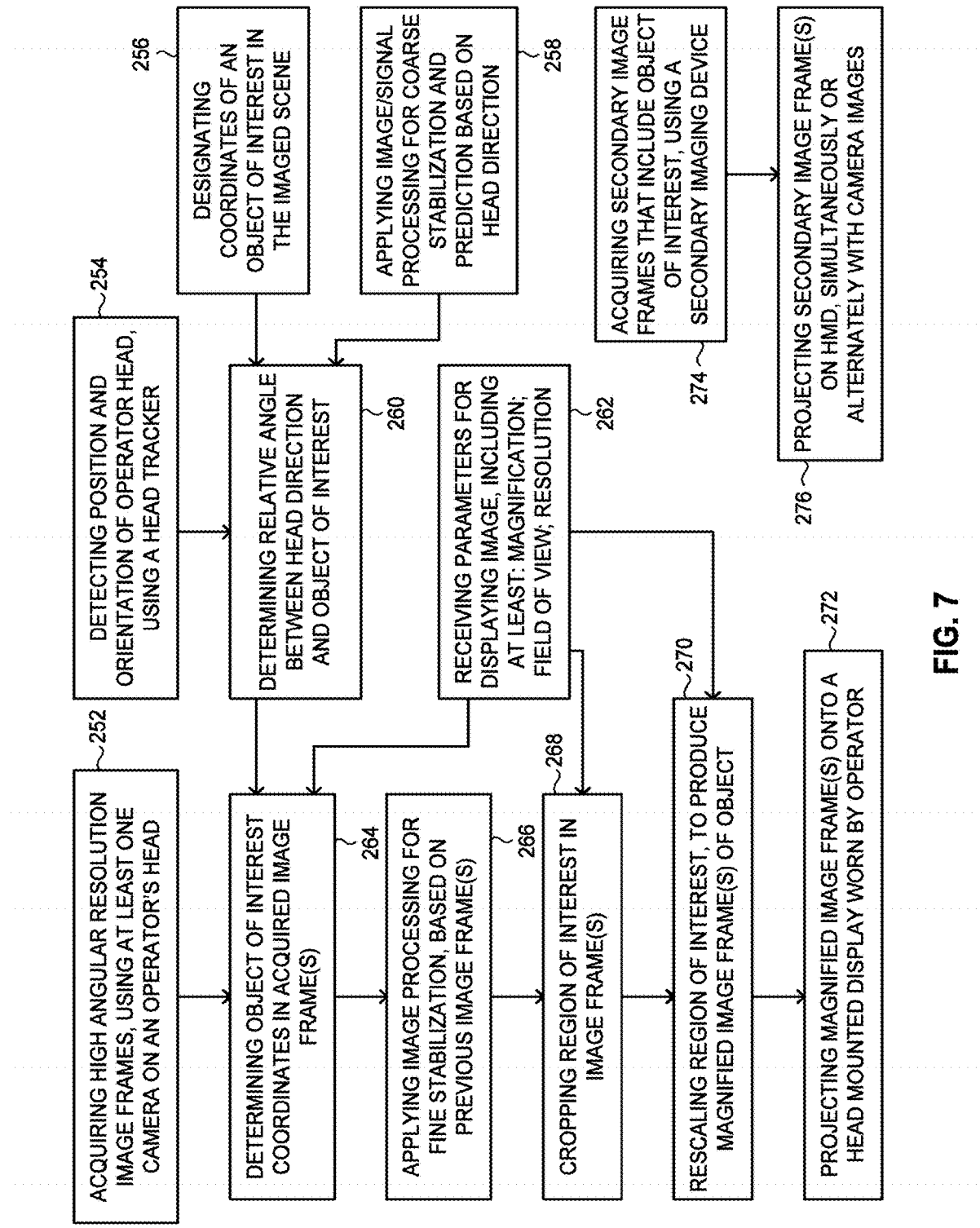
FIG. 7 is a block diagram of a method for presenting a magnified image of an object of interest in the environment of an operator, operative in accordance with an embodiment of the present invention.

Reference is now made to FIG. 7, which is a block diagram of a method for presenting a magnified image of an object of interest in the environment of an operator, operative in accordance with an embodiment of the present invention. In procedure 252, a sequence of image frames at a high angular resolution are acquired, using at least one camera disposed on the head of an operator. Referring to FIGS. 1 and 3, head-mounted camera 112 is configured to capture images around the line-of-sight of the operator 110, in accordance with the direction that operator 110 is facing. Camera 112 captures a sequence of images 142, 144, 146 at a high angular resolution (relative to human vision), each captured image respective of a particular head direction of operator 112.

In procedure 254, the position and orientation of the operator head is detected, using a head tracker. Referring to FIGS. 1 and 3, head tracker 114 detects the direction that operator 110 is facing, during each of the captured images 142, 144, 146. More particularly, head tracker determines at least the head orientation (may also determine position), providing an indication of a general LOS of operator 110, relative to a reference coordinate system. Optionally, the eye gaze direction of operator 110 may also be detected using an eye tracker 116, which may be used to assist in determining a general LOS of operator 110 for each image.

In procedure 256, coordinates of an object of interest in the imaged scene is designated. Referring to FIGS. 1 and 3, operator 110 designates at least one point located in the physical environment in his FOV, such as object of interest 140 representing the patient's heart. Operator 110 may indicate object 140 via user interface 120, such as by entering the center coordinates of object 140 with respect to a reference coordinate system, or by designating object 140 on a previous image displayed on HMD 118. The object of interest coordinates may also be indicated by another user (i.e., other than operator 110), or by system 100 indicating the coordinates using an algorithm and/or memory data (such as "bookmarking").

In an optional procedure 258, image or signal processing is applied for coarse stabilization and prediction based on the head direction. Referring to FIGS. 1 and 3, processor 122 applies some form of image processing or signal processing, in accordance with the head direction detected by head tracker 114. For example, processor 122 may apply image filters to the captured images 142, 144, 146, or alter the image signal in some manner. The image/signal processing provides a coarse stabilization of the image to conform to the LOS of operator 110 (e.g., to account for head movements and vibrations), as well as a general prediction of object 140 to assist subsequent image processing.

In procedure 260, the relative angle between the head direction and the object of interest is determined. Referring to FIGS. 1 and 3, processor 122 determines the relative angle between the head direction of operator 110 (as detected via head tracker 114), and the real-world coordinates of object 140. This angle may be calculated based on the orientation of head tracker 114, the coordinates of the object of interest 140, and the applied filters for prediction and stabilization, and/or directly from the captured images 142, 144, 146.

In procedure 262, parameters for displaying the image are received. Referring to FIGS. 1 and 3, operator 110 provides an indication of relevant parameters for how the displayed image should appear, such as at least the magnification factor of the displayed image, and the relative location of the image on HMD 118. Operator 110 may provide default parameters for system 100 during an initialization process, may change parameters manually and/or define conditions for altering or adjusting the display parameters automatically.

In procedure 264, coordinates of the object of interest is determined in the acquired image frames. Referring to FIGS. 1 and 3, processor 122 determines the image coordinates (pixels) of object 140 in each of the original camera images 142, 144, 146 (depicted by a boundary and a cross in FIG. 3). It is noted that processor 122 may determine the object coordinates individually in each image frame, or alternatively may track the location of object 140 between image frames using standard image tracking techniques known in the art. Processor 122 may also combine these approaches by tracking the location of object 140 over a given number of image frames, and then freshly determining the location in the next image frame using the reference data, in order to recalibrate (and avoid the accumulation of tracking errors). In addition, processor 122 may incorporate predicted values of the coordinates of object 140 to increase accuracy, such as using the detected head direction of operator 110, in accordance with a suitable prediction model (optionally combined with image tracking). At this stage (or later), a broader region may be cropped around object 140 in the image. The boundaries of the broader region can be larger than the region of object 140 for display, so after additional stabilization, additional cropping can be performed.

In an optional procedure 266, image processing is applied for fine stabilization, based on a previous image frame. Referring to FIGS. 1 and 3, processor 122 performs image stabilization processing on captured images 142, 144, 146, based on at least a portion of at least one previous (e.g., cropped and magnified) image frame. The image stabilization serves to compensate for movements or vibrations in the displayed image resulting from head movements of operator 110 or from insufficient accuracy of head tracker 114, drifting, vibrations, and/or other noise sources.

In an optional procedure 268, a region of interest is cropped in the image frames. Referring to FIGS. 1, 3 and 4, for each image frame 142, 144, 146, processor 122 crops a region of interest encompassing object 140, by removing at least some portions of the image surrounding object 140. It is appreciated that the cropping may be implemented as part of or in conjunction with the image processing defined in procedure 266. Alternatively, the image processing of procedure 266 may be performed after an initial cropping of a broader region surrounding object 140, in which case a further cropping process may be required. It is further noted that the need for cropping may be obviated, such as by merely rescaling the captured images to achieve a desired magnification factor on display 118 while taking into account the camera FOV in relation to the display FOV.

In procedure 270, the region of interest is rescaled to produce a magnified image frame of the object. Referring to FIGS. 1, 3 and 4, for each image frame 142, 144, 146, processor 122 rescales or resizes (digitally magnifies) the remaining cropped image portion (i.e., the region of interest) by the required amount, such as in accordance with the selected magnification factor indicated for the displaying image, or such that the cropped image portion substantially fits the entire displayed image frame. Processor 122 may alternatively rescale the entire captured image frame 142, 144, 146 (i.e., rather than rescaling only a cropped region of interest), so as to fit the FOV of display 118 to obtain the desired magnification.

In procedure 272, the magnified image frame is projected onto a head-mounted display worn by the operator. Referring to FIGS. 1 and 4, the image frames of magnified object 140 are displayed sequentially on HMD 118 worn by operator 110. For example, for a first head direction, operator 110 sees displayed view 152 that includes a pair of magnified images 152A, 152B of the patient's heart projected on HMD 118 in front of each eye of operator 110. Subsequently, operator 110 sees a next displayed view 154 through HMD 118 including another pair of magnified images 154A, 154B of the patient's heart (corresponding to original camera image 144), in accordance with a second head direction. Finally, operator 110 sees a third displayed view 156 through HMD 118 including a third pair of magnified images 156A, 156B of the patient's heart (corresponding to original camera image 146), in accordance with a third head direction. Each magnified image may be presented to a different eye of operator 110, respective of a different head-mounted camera (138A, 138B), to produce a stereoscopic vision effect.

In an optional procedure 274, secondary image frames that include the object of interest are acquired using a secondary imaging device. Referring to FIGS. 1 and 5, digital microscope 124 captures a sequence of image frames of the surgical procedure taking place in the FOV of operator 110, in addition to the image frames captured by head-mounted camera 112, where both sets of images encompass at least the designated object of interest 160. Each image acquired by camera 112 and by digital microscope 124 is associated with the respective head direction of operator 110 at the time these images were captured.

In an optional procedure 276, the secondary image frames are projected onto the head-mounted display, simultaneously or alternately with the camera images. Referring to FIGS. 1 and 5, processor tracks the location of the object of interest 160 in the image frames captured by digital microscope 124, and performs image processing operations on the original image frames, such as cropping, digital magnification and/or stabilization, as necessary, to generate a final image of object 160 in accordance with required display parameters. The final image frames are displayed sequentially on HMD 118 worn by operator 110, alternately and/or together with the camera-based images, as selected by operator 110. Referring to FIG. 6B, operator 110 sees a displayed view 172 through HMD 118 including a pair of magnified images 166A, 166B of the patient's heart and a background view 168, where the magnified images 166A, 166B correspond to the original images captured by digital microscope 124. Referring to FIG. 6C, operator 110 sees a displayed view 182 through HMD 118 including a first pair of magnified images 164A, 164B of the patient's heart, together with a second pair of magnified images 166A, 166B of the patient's heart and a background view 168, where the first magnified images 164A, 164B correspond to the original images captured by camera 112 and the second magnified images 166A, 166B correspond the original images captured by digital microscope 124.

The method of FIG. 7 is generally implemented in an iterative manner, such that at least some of the procedures are performed repeatedly and/or continuously, in order to maintain a magnified view of the designated object of interest over a sequence of image frames (i.e., so that the magnified images remains locked onto the object of interest for at least a selected duration).

While the systems have been described hereinabove in conjunction with medical imaging, the present invention is generally applicable to any kind of imaging for any purpose and may be employed in a wide variety of applications, such as, for example, industrial, commercial, aerial, security, or recreational applications.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A system for presenting magnified images locked onto an object of interest in the environment of an operator, the system comprising:
at least one camera, disposed on the head of said operator such that said camera moves in conjunction with said head of said operator, said camera configured to acquire a sequence of image frames of a scene;
a head tracker, configured to detect the line-of-sight (LOS) of said operator by detecting at least the orientation of the head of said operator;
a processor, coupled with said camera and with said head tracker, said processor configured to obtain designated coordinates of at least one object of interest in said scene, said processor further configured to determine the relative angle between the detected operator LOS and said object of interest, said processor further configured to determine the coordinates of said object of interest in the acquired image frames, said processor further configured to apply image processing for fine stabilization of said image frames based on at least one previous image frame so as to at least compensate for head movements of said operator, and said processor further configured to rescale a region surrounding said object of interest in said image frames, in accordance with at least one display parameter, to produce respective magnified image frames of said object of interest; and a head-mounted display (HMD) worn by said operator and coupled with said processor, said HMD configured to display said magnified image frames to said operator such that said object of interest appears in a defined position on the display regardless of the head movements of said operator.

2. The system of claim 1, wherein said processor is further configured to apply image or signal processing for coarse stabilization of said image frames, based on said detected operator LOS.

3. The system of claim 1, wherein said processor is further configured to crop said region surrounding said object of interest in said image frame prior to rescaling.

4. The system of claim 1, wherein said processor is further coupled with a secondary imaging device, configured to acquire secondary image frames including said object of interest,
said processor being further configured to determine the coordinates of said object of interest in said secondary image frames, and
said HMD being further configured to selectively display the secondary image frames to said operator.

5. The system of claim 1, wherein said HMD displays said magnified image frame such that said object of interest appears superimposed at its true geolocation, in relation to the LOS of said operator.

6. The system of claim 1, wherein said HMD is configured to display supplementary content overlaid onto the magnified image frames displayed by said HMD, wherein said supplementary content appears magnified in relation to the magnification of said object of interest in said magnified image frame.

7. The system of claim 1, wherein said camera comprises a plurality of cameras, and wherein said HMD is configured to display a different image toward each eye of said operator, providing a stereoscopic view of said object of interest.

8. The system of claim 7, wherein said processor is further configured to determine the distance between said operator and said object of interest, and to adjust said magnified image frame in accordance with the determined distance.

9. The system of claim 1, wherein said processor is further configured to track multiple objects of interest in said acquired image frames, and to generate a plurality of magnified image frames respective of each of said objects of interest, wherein said HMD is further configured to selectively display at least one of said generated magnified image frames.

10. The system of claim 1, further comprising an eye tracker, coupled with said processor, said eye tracker configured to detect the gaze direction of said operator, wherein said LOS of said operator is further determined in accordance with the detected gaze direction.

11. The system of claim 1, wherein said HMD comprises a transparent display, configured to present a displayed image while allowing a see-through view of said scene in said operator FOV.

12. The system of claim 1, wherein said HMD is further configured to provide at least one notification selected from the group consisting of:
a notification of an obstruction of said object of interest; and
a notification of said object of interest exceeding the FOV of said camera.

13. The system of claim 1, further comprising an illuminator, configured to illuminate said object of interest in accordance with the LOS of said operator.

14. An arrangement of a plurality of systems as claimed in claim 1, said systems being communicatively coupled with one another.

15. A method for presenting magnified images locked onto an object of interest in the environment of an operator, the method comprising the procedures of:
   acquiring a sequence of image frames of a scene, using at least one camera disposed on the head of said operator such that said camera moves in conjunction with said head of said operator;
   detecting the line-of-sight (LOS) of said operator by detecting at least the orientation of the head of said operator;
   designating coordinates of at least one object of interest in said scene;
   determining the relative angle between the detected operator LOS and said object of interest;
   determining the coordinates of said object of interest in the acquired image frames;
   applying image processing for fine stabilization of said image frames based on at least one previous image frame so as to at least compensate for head movements of said operator;
   rescaling a region surrounding said object of interest in said image frames, in accordance with at least one display parameter, to produce respective magnified image frames of said object of interest; and
   displaying said magnified image frames on a head-mounted display (HMD) worn by said operator, such that said object of interest appears in a defined position on the display regardless of the head movements of said operator.

16. The method of claim 15, further comprising the procedure of applying image or signal processing for coarse stabilization of said image frames, based on the detected LOS of said operator.

17. The method of claim 15, further comprising the procedure of cropping said region surrounding said object of interest in said image frame prior to rescaling.

18. The method of claim 15, further comprising the procedures of:
   acquiring secondary image frames including said object of interest, using at least one secondary imaging device; and
   displaying the secondary image frames on said HMD.

19. The method of claim 15, wherein said procedure of displaying said magnified image frames on a HMD comprises displaying a different image toward each eye of said operator, providing a stereoscopic view of said magnified object of interest.

20. The method of claim 15, further comprising at least one procedure selected from the group consisting of:
   providing a notification of an obstruction of said object of interest; and
   providing a notification of said object of interest exceeding the FOV of said camera.

* * * * *